June 21, 1960
R. C. HARTWICK
2,941,438
NUT WITH ADJUSTABLE THREAD MEANS TO
PERMIT SLIDING MOVEMENT
Filed April 4, 1957
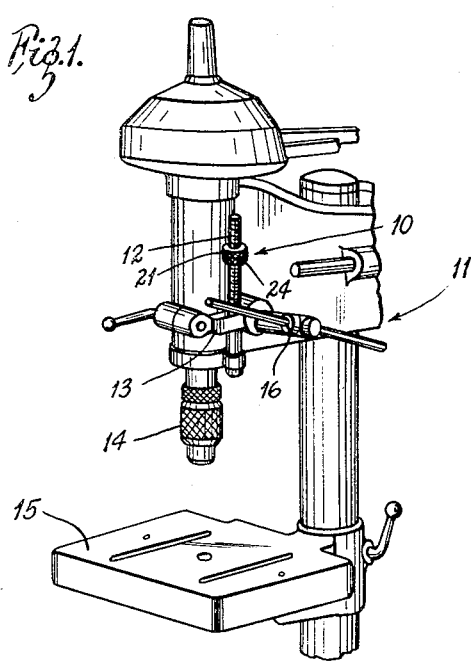
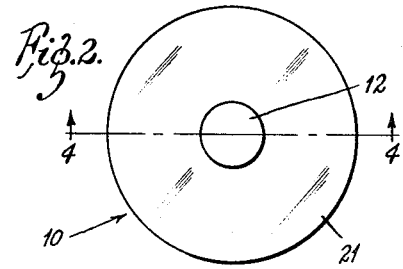
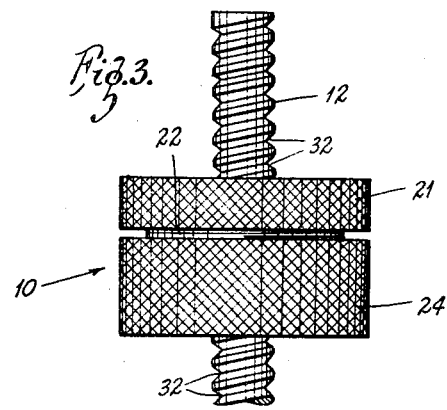
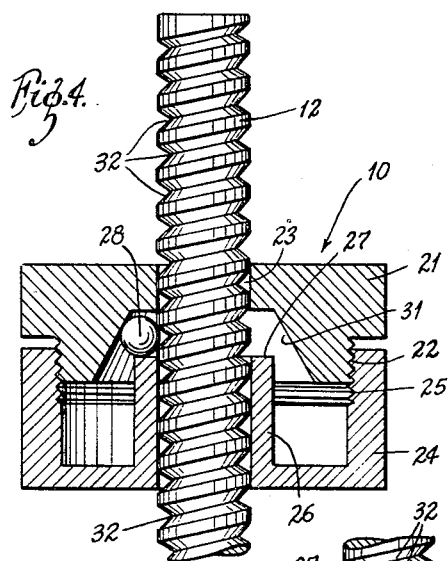
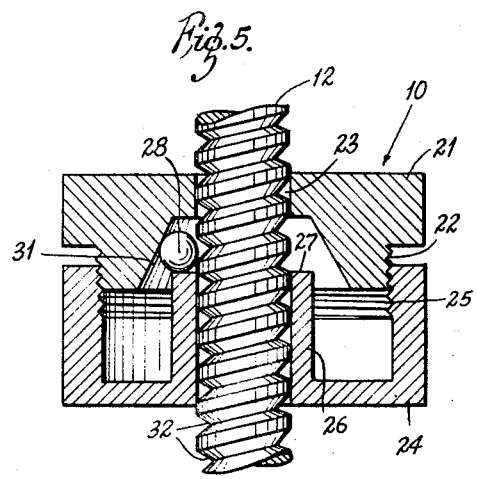
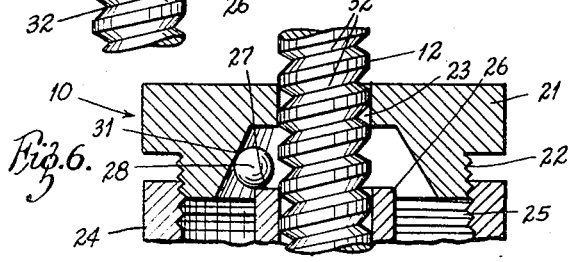
INVENTOR:
RALPH C. HARTWICK,
By Kingsland, Rogers & Ezell
ATTORNEYS

United States Patent Office 2,941,438
Patented June 21, 1960

2,941,438

NUT WITH ADJUSTABLE THREAD MEANS TO PERMIT SLIDING MOVEMENT

Ralph C. Hartwick, Red Bud, Ill., assignor of one-half to Walter E. Adair, Baldwin, Ill.

Filed Apr. 4, 1957, Ser. No. 650,604

1 Claim. (Cl. 85—33)

This invention relates to adjustable locking devices and in particular is concerned with an adjustable lock nut or similar device which may be adjusted through a rough and a fine adjustment upon a threaded shaft.

By means of this invention, there has been provided a device which may be locked with respect to a shaft and which may then be adjusted to a position where it may then be manually moved in axial direction upon a shaft to a desired position and then locked in place. Also, there is provided a means whereby the device may be further adjusted to a fine adjustment condition whereby it can be adjusted by helical rotation around the lands of the threaded shaft. All the adjustment means are effected by relatively positioning two parts of the device with respect to one another which is effected by means of a threaded engagement.

In the simplest form the invention can be used as a lock nut upon a threaded shaft. When so used, the lock nut may be locked in any desired position upon the shaft and then may be loosened to a first position where it may be finely adjusted by helical rotation about the shaft and then it may be further loosened to a position where it can be roughly adjusted by manually moving the entire device axially along the shaft. The locking position and the fine adjustment position are effected by a detent mechanism in which a detent element is locked in the land of the shaft in the locked position of the device and in which it may be loosened in the fine adjustment position whereby the detent rides in the lands of the shaft as the device is helically rotated. In the free rough adjustment whereby the device is axially moved along the shaft, the detent is adapted to be fully withdrawn from engagement with the lands of the shaft.

This locking device is very advantageous in a number of applications. Since the device is composed of two manually adjustable main members, which may be termed chuck members, it can be very easily operated by unskilled operators. For complete operation, the only adjustments required are the relative adjustment of the chuck members with respect to one another through three positions, which are the locked position, the fine adjustment position and the rough adjustment position, which is effected by the relative positioning of one chuck member with respect to the other.

The adjustable locking device finds great adaptability and convenient usage as an adjustable stop nut upon various types of equipment. Thus, as an example only, it may be used with drill presses in which the adjustable lowering of the drill press to various adjustable positions can be very easily effected through employment as a stop nut. It is to be understood, however, that the application of this invention is of broad scope, and is not restricted to any such application as herein described, which is for the purpose of illustration and example only.

Accordingly, it is an object of this invention to provide an adjustable locking device which may be used upon a shaft in which the device may be set in a locking position, a fine adjustment position and a rough adjustment position by a relative rotation of one part of the locking device with respect to another.

It is a further object of this invention to provide a locking device which may be used upon a threaded shaft in which the locking device may be locked in position, finely adjusted by helical rotation of the device about the shaft and roughly adjusted by axial movement directly along the shaft by relative adjustment of one part of the locking device with respect to another.

It is still another object of this invention to provide an adjustable locking device for a threaded shaft composed of two members which are adjustable with respect to one another, and which cooperate through a detent element with respect to the lands of the shaft, in which a locked position may be effected by locking the detent element in the lands of the shaft and in which the fine adjustment can be obtained by retaining the detent element loosely in the lands of the shaft and in which a rough axial adjustment along the length of the shaft can be effected by withdrawing the detent element from any restrictive engagement with the lands of the shaft.

Yet a further object of this invention is to provide an adjustable lock nut for a threaded shaft comprised of two chuck members which are relatively adjustable with respect to one another and which cooperate with a detent element engageable with the lands of the shaft and which is adjusted by the relative adjustment of the members whereby the adjustment of the chuck members with respect to one another enables the device to be locked upon the shaft in one adjustment, helically moved about the shaft in a fine adjustment manner by another positioning of the members with respect to one another and a rough adjustment of the device axially along the shaft by a third adjustment of the members with respect to one another.

Still another object of this invention is to provide an adjustable locking device which may be locked in position upon a shaft, finely adjusted by helical rotation about the shaft and roughly adjusted by axial movement along the shaft by manual adjustment in which all three manners of operation can be effected by the extent to which one chuck member is adjusted with respect to another chuck member and in which the device is simple to operate and is rugged in construction and made of standard materials.

Further objects of this invention will appear in the detailed description which follows and will be further apparent to those skilled in the art.

For the purpose of illustration of this invention, a preferred embodiment is shown in the accompanying drawing. This embodiment is shown applied to usage in a drill press, but it is to be understood that the application is of broader scope and that the device can be used in a manifold number of other apparatuses where the adjustment of a locking device on a shaft is desired.

In the drawings:

Figure 1 is a pictorial illustration of the adjustable locking device employed upon a drill press;

Figure 2 is an enlarged plan view of the locking device on a threaded shaft;

Figure 3 is a view in front elevation of the locking device and shaft of Figure 2;

Figure 4 is a view in section taken on the line 4—4 of Figure 2, showing the adjustable chuck members, the detent element and the shaft in cooperating and locked engagement;

Figure 5 is a view in elevation taken similarly to Figure 4, showing relative adjustment of the chuck members with respect to one another to permit the fine adjustment of the locking device upon the shaft; and Figure 6 is a fragmentary view in elevation taken similarly to Figures 4 and 5, showing the further adjustment of the chuck members with respect to one another to permit the rough axial adjustment of the locking device upon the shaft and in which the detent element is withdrawn from any restrictive engagement with the lands of the shaft.

In Figure 1 the locking device of this invention is generally indicated at 10 in association with a conventional drill press 11. The locking device is positioned upon the drill press adjustment shaft 12 which cooperates with a stop rest 13 to confine the movement of the drill head 14 with respect to the work rest 15. A handle 16 is employed to move the drill head. Such conventional drill presses have in the past used two nuts upon the adjustment shaft 12 which may be screwed to various positions of adjustment upon the shaft 12 to limit the degree of movement of the drill head 14. The use of such nuts has required the separate adjustment of each nut which is a lengthy and time consuming operation when rough and fine adjustments are desired.

The locking device of this invention is shown in full detail in Figures 2, 3 and 4. It is shown in association with a shaft 12 which may be the same shaft as employed in a drill press. The locking device is comprised of a chuck member 21 which has a threaded male surface 22 on its exterior. This member is further provided with a central opening 23 which provides a small clearance for the exterior of the shaft 12. The other major component of the locking device comprises a second chuck member 24 which has an internally threaded portion 25 engaging with the threaded portion of the first member. The second member is provided with an internal cylindrical portion 26 which loosely fits around the shaft 12 and is provided with a top bearing surface 27. The bearing surface supports a detent element 28 which is in the form of a small steel ball.

It will be seen that the first chuck member 21 is further provided with a cammed bearing surface 31. By this construction the detent element 28 is adapted to be confined upon the bearing portion 27 of the second chuck member by retention against the bearing surface 31 of the first chuck member. At the other side of the detent element 28 it will be confined either within a land 32 of the shaft 12 in restrictive or loose engagement or unconfined engagement depending upon the adjustment of the members 21 and 24 with respect to one another.

*Use*

The locking device 10 is adapted to be very simply locked upon the shaft 12 to the position shown in Figure 4. This is effected by screwing the bottom chuck member 24 up against the top chuck member 21 as far as it will go by manual operation. As this operation is effected, the detent element 28 will be contacted by the bearing surface 31 of the top chuck member and forced into the land 32 of the shaft 12. The bottom chuck member 24 is screwed against the top chuck member 21 as tightly as can be effected by manual operation, which then completes the locking engagement to lock the detent element in the lands of the shaft.

Normally, when the locking device is unlocked from the shaft, it is desired to adjust it rapidly to a desired position in a rough adjustment operation, and the final adjustment is then desirably effected by a fine adjustment means. Where such an initial rough adjustment is desired, the bottom chuck member 24 is unscrewed from the top chuck member 21 to the position shown in Figure 6. Thus, as the bearing surface 27 is lowered with respect to the top chuck member 21 by this operation, the detent element 28 will be lowered until it falls out of engagement with any portion of the lands 32 of the shaft 12. Thus, in the position shown in Figure 4, the detent element is not confined in any manner between the lands of the shaft, and the entire device may be axially moved to any desired position along the length of the shaft. It will be seen, however, that the detent element is retained upon the bearing portion of the bottom chuck member in this operation by the confining engagement with the cammed bearing surface 31.

When the locking device 10 has been moved to approximately the desired final position, it may then be finely adjusted to the final adjustment position. This is effected by partially screwing in the bottom chuck member 24 with respect to the top chuck member 21 to the position shown in Figure 5. This position is intermediate the locked position of Figure 4 and the free rough adjustment position of Figure 6. Thus in this adjustment it will be seen that the detent element 28 is loosely engaged within the land 32 of the shaft 12. It is confined in this position by the cammed bearing surface 31 of the top chuck member so that it cannot ride out of the land of the shaft. However, because of the loose engagement of the detent element 28 within a portion of the land 32, the entire locking device 10 may be rotated as a unit helically about the shaft. It will be seen that there is a slight clearance in Figure 5 between the detent element 28 and the land surfaces of the shaft, whereby this engagement is made possible.

By virtue of the above-described sequence of operation in Figures 4, 5 and 6 for the locking engagement, the fine engagement and the rough axial engagement it is evident that the entire device may be operated very simply and effectively. The only operation that is required is the adjustment of the bottom chuck member 24 with respect to the top chuck member 21. Although this has been described as being a threaded engagement whereby relative rotation effects the adjustment, it is evident that other types of relative adjustment between the chucks may be employed, as will be evident to those skilled in the art.

The use of the locking device 10 upon the drill press 11 of Figure 1 should be self-evident with the above description. However, it will be seen that the locking device 10 may be locked in any desired position with respect to the shaft 12. When so locked the handle 16 may be operated to cause the lowering of the drill head 14. This lowering is limited by the subsequent engagement of the locking device with the stop rest 13. Such adjustments are conventionally desirable in precision drilling operations to limit the extent of drilling upon various sized workpieces and to drill holes of varying depths in the workpiece. Where the lowering of the drill head 14 is desired to be changed, the locking device 10 can be rapidly adjusted to any desired position by the rough adjustment and the fine adjustment operation described above.

It will be readily apparent that the locking device of this invention will find convenient employment in a number of applications where locking and adjustment upon a shaft are desired. It will also be obvious to those skilled in the art that various changes and modifications may be made in this invention and that the invention is not limited to the specific showing herein, but is defined by the scope of the claim appended hereto.

What is claimed is:

An adjustable locking device having means for locking itself upon a fixed threaded shaft, said means including an upper first member having a cylindrical opening slightly larger than the diameter of said shaft to provide a sliding fit for said member upon said shaft, the cylindrical side walls of the opening being of greater height than the distance between the threads of the shaft, said first member being provided with a downwardly depending annular flange element, said element having a downwardly flaring frusto-conical inner camming surface and an externally threaded outer surface, said camming surface receiving a ball-like detent element positioned between said surface and the shaft and a second lower open topped cylindrical member adjustably engageable with said first member, said second member having outer walls that are internally threaded and a concentrically positioned inner sleeve portion defining an annnular space receiving the annular flange element of said first member in threaded engagement, said inner sleeve portion being of a height greater than the distance between the threads of said shaft and having a cylindrical opening slightly larger than the diameter of said shaft to provide a sliding fit upon said shaft, a top portion of said sleeve supporting said detent, said second member being adjustable with respect to said first member to a telescoped first portion in which the sleeve portion engageable with the detent forces the detent against the camming surface of said first member and a land of the threaded shaft to lock the device with respect to said shaft, and a relatively expanded second position where the sleeve portion engageable with the detent urges the detent against the camming surface into a loosely retained position in the land of the shaft whereby the device may be finely adjusted by helical movement as a unit about said shaft and a fully expanded third position in which the detent is freed from engagement with the lands of the shaft and the device may be roughly adjusted by freely moving it axially along said shaft.

References Cited in the file of this patent

UNITED STATES PATENTS

| | | |
|---|---|---|
| 1,061,776 | O'Hare | May 13, 1913 |
| 1,130,716 | Dressel | Mar. 9, 1915 |
| 1,953,830 | Park | Apr. 3, 1934 |
| 2,261,505 | Schlesinger | Nov. 4, 1941 |
| 2,393,764 | Frank | Jan. 26, 1946 |
| 2,574,653 | Miller | Nov. 13, 1951 |
| 2,736,227 | Stroble | Feb. 28, 1956 |
| 2,789,458 | Skeisvoll | Apr. 23, 1957 |
| 2,830,779 | Wentling | Apr. 15, 1958 |